Figure 1:
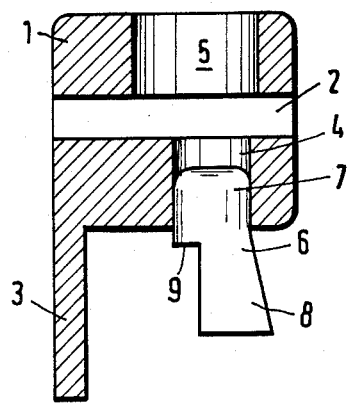

United States Patent [19]

Six

[11] Patent Number: 4,607,414

[45] Date of Patent: Aug. 26, 1986

[54] DEVICE FOR TYING AN ELONGATE OBJECT, FOR EXAMPLE A CABLE TRUNK

[75] Inventor: Jörg Six, Norderstedt, Fed. Rep. of Germany

[73] Assignee: Paul Hellermann GmbH, Fed. Rep. of Germany

[21] Appl. No.: 650,434

[22] Filed: Sep. 14, 1984

[30] Foreign Application Priority Data

Sep. 21, 1983 [DE] Fed. Rep. of Germany ... 8327158[U]

[51] Int. Cl.$^4$ ............................................. B65D 63/00
[52] U.S. Cl. ................................. 24/16 PB; 24/25; 24/21; 292/315; 292/326
[58] Field of Search .............. 24/21, 25, 16 PB, 16 R; 292/315, 326, 320, 321, 329

[56] References Cited

U.S. PATENT DOCUMENTS

| | | | |
|---|---|---|---|
| 149,468 | 4/1874 | Goldsmith | 24/25 |
| 193,320 | 7/1877 | Clarke | 292/326 |
| 961,069 | 6/1910 | Crudginton | 292/321 |
| 1,107,935 | 6/1961 | Erke | 292/325 |
| 2,988,391 | 10/1963 | Erke | 292/325 |
| 3,015,865 | 1/1962 | Rapuzzi | 24/21 |
| 3,226,882 | 1/1966 | Lichtenthaler | 24/16 PB X |
| 3,353,227 | 11/1967 | Kabel | 24/16 PB |
| 3,457,598 | 7/1969 | Mariani | 24/16 PB |
| 4,424,994 | 1/1984 | Dowden | 292/318 |

FOREIGN PATENT DOCUMENTS

| | | |
|---|---|---|
| 0045164 | 2/1982 | European Pat. Off. . |
| 0075501 | 3/1983 | European Pat. Off. . |
| 1279801 | 10/1968 | Fed. Rep. of Germany . |
| 2054520 | 5/1972 | Fed. Rep. of Germany . |
| 2608704 | 8/1977 | Fed. Rep. of Germany ..... 24/21 R |
| 2486172 | 8/1982 | France . |

Primary Examiner—William E. Lyddane
Assistant Examiner—Laurie K. Cranmer
Attorney, Agent, or Firm—Prutzman, Kalb Chilton & Alix

[57] ABSTRACT

Device for tying an elongate object, a cable bundle for example, having a band to be tensioned round the object and a lock connecting the band ends, which exhibits a passage orifice for at least one band end and a bore oriented transversely thereto, which contains a pin to be driven through the band located in the passage orifice. For better securing of the pin in its closed position, the pin and the bore exhibit, on their side facing the object to be tied, catch edges engaging behind each other in the releasing direction of the pin.

14 Claims, 6 Drawing Figures

U.S. Patent     Aug. 26, 1986     4,607,414

DEVICE FOR TYING AN ELONGATE OBJECT, FOR EXAMPLE A CABLE TRUNK

DESCRIPTION

The invention relates to a device for tying an elongate object, for example a cable bundle, having a band to be tensioned round the object and a lock connecting the band ends, which exhibits a passage orifice for at least one band end and a bore oriented transversely thereto, which contains a pin to be driven through the band located in the passage orifice, whilst the pin and the bore are provided with cooperating projections and catch recessions to secure the pin in its final position.

In a known device of this type (U.S. Pat. No. 3,353,227) the band is shaped in pot-like configuration round the end of the pin when the pin is driven through. The pin is secured in the closed position by squeezing it flat rivet-head fashion at its leading end conjointly with the deep-drawn band surrounding it within a widened part of the bore and therefore assumes a diameter which is greater than the diameter in the part of the bore located behind it. Because the material of the lock, of the band and of the pin is generally somewhat yielding, when produced from polyamide for example, the thickening is effected forcibly in practice, because otherwise there is a danger of the pin slipping back with corresponding widening of the lock body under high band tension. However, because irregularities may occur in the closing of the band closure, which may result in the thickening of the pin being less strong than is in fact desirable, it is impossible to exclude the danger that a closure may sometimes exhibit insufficient strength due to insufficient pin deformation.

However, it is also known in order to avoid this disadvantage (FR-A 2,486,172, FIG. 1), to provide the pin and the bore with cooperating screwthreads; however this has the disadvantage that the pin must be screwed onerously into the lock and thereby promotes the danger that the pin may inadvertently not be screwed far enough into the lock.

It is also known (FR-A 2,486,172, FIG. 7; U.S. Pat. No. 2,988,391) to provide the band lock with a depression into which the band ends to be secured are pressed for their fastening by means of a pin, whilst the pin and the depression exhibit cooperating catch projections and catch recessions which come into engagement by the pushing of the pin into the depression. The pin is then stressed exclusively in its releasing direction by the force exerted upon it by the band, so that the catch connection has to absorb the entire force transmitted by the band to the pin. However, as is known, catch connections of plastic parts are capable of absorbing only limited forces, so that the known device is unsuitable for high stresses.

The underlying aim of the invention is to produce a device of the type initially defined which exhibits greater reliability of closure, particularly also irrespectively of the care with which the closure has been completed.

The solution according to the invention is that the pin and the bore exhibit, on their side facing the object to be tied, catch edges engaging behind each other in the releasing direction of the pin.

The invention is based upon the idea that, in this arrangement, the pin is pressed by the band forces on the side of the bore facing the object to be tied, and that a catch connection provided on this side is therefore held together not only by the elastic forces of the material used, but rather by the band forces. The securing force with which the catch connection maintains the pin in the bore is therefore the greater, the higher the wall loading.

It is sufficient in principle to provide the cooperating catch edges only on this side of the pin facing the object. However, it is more convenient to arrange the edge (or edges) on the pin encircling, so that one is independent of a possibly tedious and erroneous orientation of the pin.

The mutual engagement of the catch edges is all the more secure, the less the lock body is deformed under the band tension in the region of the catch edges. Such a deformation may originate mainly from the fact that the lock body is exposed to a tension widening it by the band ends tending to separate in the opposite direction. This is counteracted according to the invention since the lock is of reinforced construction on the side of the object to be tied, namely preferably by fins provided on the lock body on the side near the object laterally of the passage orifice. If a band end is connected integrally to the lock, then it is convenient to make these reinforcing fins merge into the band in their longitudinal direction, so that the tensile stresses of the band are introduced, at least for the greater part, into these fins, and are transmitted by the latter to that part of the lock body which, considered from the band, is located beyond the passage orifice.

If the lock body exhibits, on its side facing the object, an abutment surface which is oriented at right angles to the passage orifice, then the band end to be secured in the lock is deviated through approximately 90° at the entrance into the passage orifice. Due to the short distances, the tensile stresses appearing on the outside of its bend also act in the region in which it is deformed by the pin, since they can reinforce those forces which urge the pin in the releasing direction. It is therefore convenient, according to the invention, if the deviation angle of the band at its entrance into the passage orifices is reduced in that the abutment surface of the lock body which abuts the object to be tied directly or through the intermediary of the band includes an angle of more than 90° to the direction of the passage orifice on the side of the band entering the passage orifice. The reinforcing pins previously referred to are conveniently used to form this abutment surface.

Figure 2:
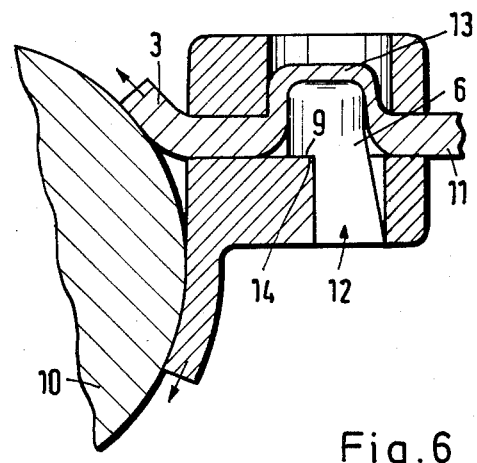
Figure 5:
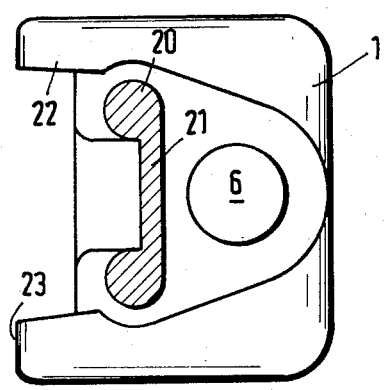
Figure 6:
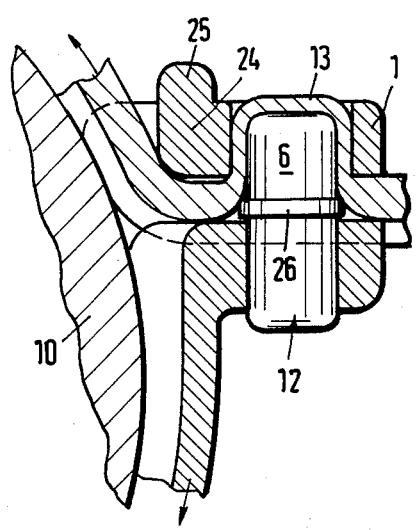
Figure 3:
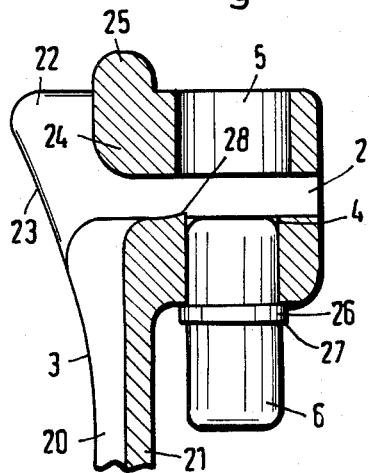
Figure 4:
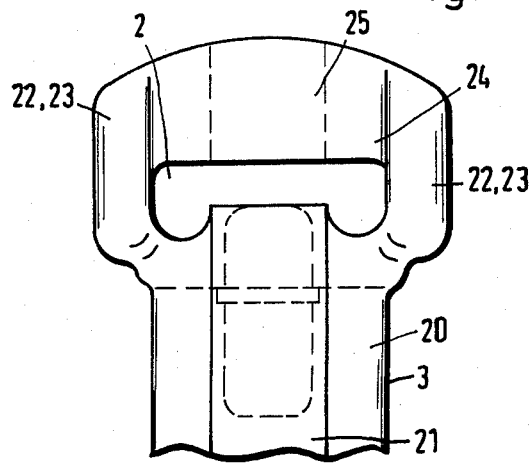

The invention is explained more fully below with reference to the drawing, which exhibits two advantageous exemplary embodiments, and in which:

FIG. 1 shows a longitudinal section through a first embodiment of a lock before its use, FIG. 2 shows a longitudinal section through the same embodiment of a lock in the closed state, FIG. 3 shows a longitudinal section through a second embodiment before its use, FIG. 4 shows an elevation of this embodiment viewed from the left-hand side in FIG. 3, FIG. 5 shows an elevation of this embodiment viewed from underneath in FIG. 3, and FIG. 6 shows a longitudinal section, corresponding to FIG. 3 in the closed state.

The lock body 1 of the embodiment according to FIGS. 1 and 2, which should be imagined as of square external shape, has a flat passage orifice 2 of constant cross-section which is equal to that of the band 3, which consists integrally with the lock body 1 of polyamide for example. The lock body 1 contains, transversely to the passage orifice 2, a bore, the lower section 4 of which exhibits a somewhat narrower cross-section than its upper section 5. In the lock prepared for use, the pin 6 is inserted with its head 7 fitting approximately into the bore section 4, so that it is retained therein by its friction. The foot 8 of the pin 6 is shouldered relative to the head 7 by a step at 9. The pin is somewhat narrower than the band in the transverse direction to the plane of the drawing.

For the purpose of use, the band 3 is wrapped round the object 10 to be tied; its end 11 is threaded through the passage orifice 2; it is tensioned; then the pin 6 is driven into the lock body by a force acting in the direction of the arrow 12. The band 3 is then deep-drawn in pot-shaped configuration round the head 7 of the pin 6 in the region 13, so that it encloses the head 7 of the pin 6 on five sides. The pin is forced into the lock body until its step 9 engages behind the step 14 of the lock body. Due to the tension, indicated by arrows, in the band 3, the pin 6 is drawn towards the left in FIG. 2, so that the steps 9 and 14 come fully into mutual engagement. The greater the band tension is, the more securely are the steps 9 and 14 maintained in engagement. The securing forces are therefore always greater than those forces of the band 3 which act upon the pin in the releasing direction (counter to the direction of the arrow 12).

In FIGS. 3 to 6, which illustrate the second exemplary embodiment, corresponding parts are designated by the same reference numerals as in FIGS. 1 and 2. The lock body 1 has an approximately square external configuration. It has attached integrally to it at its underside, at its edge facing the object 10 to be tied, the band 3, which is composed of two bead-shaped edges 20 and of a thinner central part 21. The bead edges 20 project in cross-section on the side facing the object to be bound. They merge laterally of the passage orifice 2 on the lock body into reinforcing fins 22 which form the abutment surfaces 23 by which the lock body abuts the surface of the object 10 to be tied. The direction of these abutment surfaces 23 includes, with the direction of the passage orifice 2, an angle which is greater than 90° on the side of the band to be introduced into the passage orifice, so that, as may be seen in FIG. 6, the latter undergoes a curvature of less than 90° at the entrance into the passage orifice. It is also clearly shown that, by virtue of these reinforcing fins, the tensile forces exerted upon the lock body by the band 3 by its end attached integrally to the lock are introduced not only into that part of the lock body which lies beneath the passage orifice 2, but also into the part 24 located above the same, which may be additionally flexurally reinforced by a bead 25 in order to be able to resist better any deformation under the tension of the band end entering the passage orifice 2. The bore is of concentric cylindrical construction in its lower section 4 and upper section 5, whilst the upper section 5 exhibits a greater diameter in order to accommodate the deep-drawn region 13 of the band 3. The pin has a cylindrical configuration concentrically along its total length, whilst its diameter is equal to that of the lower section 4 of the bore. It exhibits in its central section an annular projection 26 which forms, at least upon its under side, a catch edge or stop surface 27 oriented at right angles to the remainder of the pin surface. It is conveniently constructed identically on its upper and its lower side, as illustrated, in order that the pin need not be oriented in a specific manner for insertion into the bore. The annular projection 26 is constructed so that it can be driven through the lower section 4 of the bore in the direction of the arrow 12 with elastic deformation of the pin and of the lock body until the stop surface 27 is located above the opposite stop surface 28 of the lock body in the passage orifice 2. This state is clearly shown in FIG. 6. The annular projection 26 with the stop surface 27 forms, in cooperation with the bore section 4 and with the stop surface 28 bordering the latter, a catch connection which opposes a substantial resistance to any releasing movement of the pin counter to the direction of the arrow 12, which can be overcome only by deformation of the pin and/or of the lock. In order to increase the deformation resistance of the stop surface 28, the latter is drawn up slightly at an acute angle counter to the releasing direction of the pin 6, as may be seen in FIG. 3, so that even if it should have become deformed in the releasing direction, it still forms a right-angled step as illustrated in FIG. 2. Although the deformation resistance is high, in cases of extremely high band tensions and correspondingly intense lock body deformation, it could be insufficient in some cases to retain the pin 12 in the secured position according to FIG. 6 counter to the forces acting upon it, were it not for the addition of the effect that the tensioned band draws the pin to the left in FIG. 6, whereby the stop surfaces 27 and 28 are maintained in secure engagement on that side of the pin 6 facing the object 10 to be tied, so that it is not important whether this engagement is threatened at other points by excessive action of force, the yieldingness of the material or the lock body deformation. The reinforcing fins 22 and the bead 25, and also in general the deformation-stable construction of the lock body on its side facing the object 10 to be tied, then cooperate to keep the conditions of engagement of the stop surfaces 27, 28 so considerably free, even under conditions of heavy stress by deformations, that the engagement of the stop surfaces is not threatened by the latter.

The catch projection may be replaced by a plurality of projections, in which case, regarding the number and arrangement of these projections, it is only necessary to ensure that at least one projection must be present in that peripheral region of the pin 6 which points to the left in FIG. 6 and in which the pin circumference is drawn towards the bore circumference by the tension of the band.

The surface 23 of the fins 22 abutting the object 10 to be tied should, according to the invention, merge steadily into the surface of the bead edges 20 of the band 3, as is shown in FIG. 3, in order to ensure a uniform abutment against the object to be tied, and therefore a uniform transmission of forces. This may be necessary, for example, if the object to be tied, is a flexible sleeve which is required to be adapted snugly to a pipe connection over its total circumference. This also prevents the band 3 from being bent sharply in the region in which it merges integrally into the lock body 1, which might prejudice both the strength of the band and also the mechanical properties of the lock body. For a better abutment of the surface 23, including the adjacent parts of the edge bead 20, it may be curved concavely in conformity with the mean curvature of the object to be bound, as may be seen in FIG. 3.

To prevent damage to the annular projection when the pin 6 is pressed into the body of the lock, the pin can consist of a more resistant material. If the body of the lock consists of polyamide, the pin can, for example, consist of glass fibre-reinforced polyamide. The annular projection, on its forward side, and/or the inlet side of the bore can also be provided with a bevel or chamfer, in order to facilitate elastic deformation when the pin is pressed in.

I claim:

1. A device for tying an elongated object comprising:
   a band adapted to be disposed under tension about the object to be tied and having opposite ends, and
   a lock for connecting the band ends having
      a lock body with
         a band passageway for receiving at least one band end and having an entrance opening for inserting said one band end into the band passageway, a bore extending transversely to and intersecting said passageway intermediate the ends thereof, and
         a first catch edge facing in one axial direction of said bore and disposed adjacent said entrance opening and toward the object to be tied, and
      a locking pin configured to be driveable in said one direction within said bore and across said passageway to a locking position thereof in engagement with the band received within said passageway, said locking pin having a second catch edge for cooperative direct engagment with said first catch edge with the locking pin in its locking position, said second catch edge being disposed toward the entrance opening and the object to be tied and to directly engage said first catch edge when said pin is driven to its locking position and into engagement with the band received within the passageway to maintain said locking pin at its locking position within said bore and in engagement with the band.

2. The device of claim 1 wherein said second catch edge extends annularly about said pin.

3. The device of claim 1 wherein said lock body has a side adapted to be disposed toward the object to be tied and said side is reinforced by fins oriented laterally of the passage orifice.

4. The device of claim 3 wherein one band end is connected integrally to said lock body with said fins merging into said band.

5. The device of claim 1 wherein said band passageway has a longitudinal axis extending inwardly from said entrance opening and said lock body has an outer surface adapted to be disposed adjacent the surface of the object to the tied, said outer surface having a band directing portion forming an angle of more than 90° with the longitudinal axis of the band passageway.

6. In combination,
   an elongated object to be tied, and
   a tying device comprising
      a band having opposite ends and wrapped around said object so as to be under tension, and
      a lock assembly connecting the band ends comprising
         a lock body positioned adjacent said object having a band-receiving passageway, a borehole with upper and lower portions extending transversely through said passageway so that said upper portion is above said passageway and said lower portion is below said passageway, and a first step surface adjacent said lower portion of said borehole and disposed toward said object, said first step surface facing upwardly toward said upper portion of said borehole, one of said band ends extending through said passageway, and
         a driving pin having upper and lower ends mounted within the upper and lower portions respectively of said borehole with said upper end engaging said one band end to form a deep-drawn pot-shaped configuration of said one band end about said upper end of said pin, with the tension of said one band end exerting a force on said pin downwardly and toward said object,
         said pin having a second step surface disposed toward said object and facing downwardly, said second step surface directly engaging said first step surface of said lock body to retain said pin in said borehole,
         said force on said pin from said one band end urging said pin toward said object so as to tend to increase the amount of mutual engagement between said first and second step surfaces and to press said second step surface directly against said first step surface.

7. The combination of claim 6 wherein said upper end of said pin has an offset portion offset toward said object so as to form said second step surface, said second step surface facing downwardly toward said lower end.

8. The combination of claim 6 wherein said pin is generally cylindrical with an outer surface and an annular projection extending outwardly from said outer surface, said annular projection having a lower surface forming said second step surface.

9. The combination of claim 8 wherein said said second step surface is perpendicular to said outer surface of said pin.

10. The combination of claim 6 wherein said object is a cable bundle.

11. The combination of claim 6 wherein said lock body has first and second sides with said first side being disposed toward said object and said band-receiving passagway extending from said first side outwardly away from said object to said second side, said first side having reinforcing fins dispersed laterally from said passageway.

12. The combination of claim 11 wherein the other of said band ends is integrally connected to the lock body and said fins comprise elongated fins integrally merging longitudinally into said band.

13. The combination of claim 6 wherein the other of said band ends is integrally connected to said lock body.

14. The combination of claim 6 wherein said lock body has a side surface disposed toward said object and having an abutment portion abutting said band so that said band extends into said passageway at an angle less than 90°.

* * * * *